United States Patent Office

2,716,094
Patented Aug. 23, 1955

2,716,094

FREE-FLOWING, NON-CAKING COMPOSITIONS

Henry L. Morrill, Clayton, Mo., assignor to Monsanto Chemical Company, St. Louis, Mo., a corporation of Delaware No Drawing. Application October 17, 1952,
Serial No. 315,436

6 Claims. (Cl. 260—41)

This invention relates to free-flowing, non-caking compositions comprising polymeric water-soluble polyelectrolytes. More specifically, this invention relates to free-flowing, non-caking, finely-divided pulverulent compositions comprising certain polymeric water-soluble polyelectrolytes which render soil aggregates water-stable and which are highly hygroscopic. This invention also relates to the preparation and use of such compositions.

Polymeric water-soluble polyelectrolytes are useful for numerous purposes. For example, these polyelectrolytes have been found to be particularly useful in improving the physical structure of soils by rendering soil aggregates water-stable. For example, soils treated with these polyelectrolytes contain soil aggregates which do not crumble or disintegrate to fine particles and pack or crust when dry nor are these soil aggregates readily carried off by surface drainage water or by the wind. When these polyelectrolytes are employed to improve the physical structure of soil, they must, of course, be uniformly applied to the soil. Also they are generally employed in relatively small quantities, e. g. from 0.0002% to 2% by weight based on the tillable top soil to be treated. Consequently, they must be prepared as a readily spreadable composition to achieve the results for which they are to be used. Furthermore, such compositions must be prepared well in advance of their ultimate use and stored under a variety of atmospheric conditions. It is, therefore, essential that the compositions intended for use be free-flowing not only when prepared but also after being in contact with humid atmosphere either in shipment or in storage. It is also essential that these compositions be non-caking, that is, even though they absorb moisture during shipment or storage they do not form hard cakes, lumps or other non-friable agglomerates which, of course would prevent their being uniformly applied to the soil.

Certain of the water-soluble polyelectrolytes are rather highly hygroscopic and when exposed to a humid atmosphere will absorb up to about 80% by weight of water and become gummy or rubbery. Then when the atmosphere changes and the wet polyelectrolyte loses water, a hard cake or lump is formed.

It, is, therefore, an object of this invention to provide a free-flowing, non-caking, finely-divided pulverulent composition comprising solid hygroscopic polymeric water-soluble polyelectrolytes. It is a further object of this invention to provide such compositions containing hygroscopic polyelectrolytes which remain free-flowing and non-caking even after exposure to humid atmospheric conditions. It is a still further object of this invention to provide a composition for uniform and convenient applications of the polyelectrolyte in small quantities to the soil. It is an additional object of this invention to provide a method for preparing such compositions.

In accordance with this invention it has been discovered that on admixing solid hygroscopic polymeric water-soluble polyelectrolyte, especially those polyelectrolytes which render soil aggregates water-stable, with a mineral acid modified sub-bentonite clay and an attapulgite clay, there is obtained a composition which in a finely-divided, pulverulent state is free-flowing. Furthermore, it has been discovered that these finely-divided, pulverulent compositions not only do not cake but also retain their free-flowing properties even after long periods of exposure to a humid atmosphere.

Compositions containing as much as 50% by weight of said hygroscopic polyelectrolytes can be prepared as free-flowing, non-caking compositions. The preferred free-flowing, non-caking compositions of this invention are those which contain from about 15% to about 35% by weight of the hygroscopic polyelectrolyte and from about 65% to about 85% by weight of a mixture comprising from about 0.25 parts to about 2.0 parts by weight of an attapulgite clay for each part by weight of a mineral acid modified sub-bentonite. Such compositions when exposed to a humid atmosphere can absorb from 60% to over 90% by weight of moisture based on the polyelectrolyte and remain free-flowing and non-caking.

The compositions of this invention can be conveniently prepared by blending together each solid ingredient which has been previously reduced to a finely-divided, pulverulent state. Alternatively any one or all of the ingredients can contain a mixture of coarse and fine particles and the rough blend of these ingredients ground to a finely-divided pulverulent state.

In the course of investigation of the above described problems, a vast number of pulverulent materials were mixed with the hygroscopic water-soluble polyelectrolytes. Through this investigation it was discovered that no single inert diluent was entirely satisfactory. In fact, such materials as limestone (—325 mesh), fly ash, fuller's earth, α-cellulose, silica flour and the like when combined with the hygroscopic polyelectrolytes produced blends which became gummy after a very short exposure to a humid atmosphere. Blends containing pyrophyllite, pumice, kaolinite clays, talc, diatomaceous earth, wood flour, walnut shell flour, among others, which are commonly used pulverulent diluents, caked badly or had poor flow characteristics even before being exposed to a humid atmosphere. Even the non-swelling, non-expanding lattice clays described in my copending application Serial No. 315,435, filed October 17, 1952, when used with the hygroscopic polyelectrolytes did not produce a blend which after exposure to humid atmosphere conditions would possess the most desirable flow characteristics and would remain non-caking. However, it was discovered that a mixture containing a mineral acid modified sub-bentonite clay and an attapulgite clay could be blended with these hygroscopic water-soluble polyelectrolytes to produce finely-divided pulverulent compositions which would remain free-flowing even after exposure to a humid atmosphere. Moreover, these most unusual compositions can absorb as much as 60% to over 90% by weight of water based on the polyelectrolyte and still be free-flowing and will not cake. On the other hand, neither of these clay products when used alone with the hygroscopic polyelectrolyte will result in a finely-divided pulverulent composition possessing such unusual properties.

The clays or acid modified clays which are useful according to this invention are the acid modified sub-bentonites such as the Mississippi bentonites modified with hydrochloric acid or sulfuric acid and known to the trade as activated Mississippi bentonites. These activated clays are sold under various "Filtrol" trademark designations. The other clay employed in the composition of this invention is an attapulgite clay, sold under such trademarks as the various "Attaclay" designations among others. In general, these clays and modified clays should contain no more than about 16% by weight of water (total volatiles) which includes free moisture, bound moisture and chemically combined moisture. These clays are standard trade commodities and are available in a satisfactory finely-divided pulverulent state.

The general types of water-soluble polyelectrolytes which are useful for the treatment of soil to render soil aggregates water-stable are disclosed in a number of co-pending applications. For example, they are disclosed in my co-pending application hereinbefore cited as well as in co-pending applications Serial No. 271,280, filed February 12, 1952, now issued as United States Patent No. 2,625,529, and Serial No. 272,698, filed February 20, 1952, now issued as United States Patent No. 2,625,471, among others. In general, these polyelectrolytes are ethylene polymers having numerous side chains distributed along a substantially linear chain of carbon atoms. The side chains may be hydrocarbon groups, carboxylic acid groups or derivatives thereof, sulfonic acid groups or derivatives thereof, phosphonic acid groups or derivatives thereof, heterocyclic nitrogen groups, aminoalkyl groups, alkoxy groups as well as other organic groups. The number of such groups and the relative proportions of hydrophilic and hydrophobic groups present in the molecule of the polyelectrolyte should be such as to provide a water-soluble polymeric compound having a substantially large number of ionizable radicals. The length of the said continuous carbon chain must be such as to provide compounds having a weight-average molecular weight of at least 10,000. Water-soluble polyelectrolytes having a weight-average molecular weight as high as 300,000 and above are not only contemplated but are useful for the purposes of this invention.

These water-soluble polyelectrolytes are salts of polymers of acrylic acid, polyacrylic acids, salts of polymers of methacrylic acid, polymethacrylic acids, salts of copolymers of unsaturated polycarboxylic acids and at least one other monoolefinic monomer, copolymers of unsaturated polycarboxylic acids and at least one other mono-olefinic monomer, copolymers of unsaturated polycarboxylic acid anhydrides and at least one other mono-olefinic monomer, salts of the copolymer of the partial alkyl esters of unsaturated polycarboxylic acids and at least one other mono-olefinic monomer, copolymers of the partial alkyl esters of unsaturated polycarboxylic acids and at least one other mono-olefinic monomer, salts of polymers of sulfonated hydrocarbons, polymers of unsaturated amines, and polymers of unsaturated amides.

The expression "water-soluble polymers" as intended by its use in this specification and its appended claims, includes those which form homogeneous mixtures with water, the difficultly soluble polymers which expand in the presence of water and dissolve to at least some extent, and even some which are apparently insoluble in distilled water but which tend to dissolve in soil water. This solubility enables the movement of the molecules within the soil mass through the medium of the soil moisture.

Although most of the polyelectrolytes described above are hydrophilic in nature and do not render the soil water-repellent, there are a few of the polymers which, even though water-soluble, will make the soil water-repellent if used in excessive quantities. These polymers are those which have relatively high molecular weight dependent chains or which have a minimum number of ionizable groups. Although compositions of this kind are of marginal interest, they are entirely operative in producing improved structure, and when added in carefully controlled proportions, the objectionable water-repellent property of treated soils can be avoided.

All of the polymeric materials included in the class of compounds herein referred to as "solid synthetic polymeric water-soluble polyelectrolytes" contain a substantially linear continuous chain derived by the polymerization through aliphatic unsaturated groups and possess a sufficient molecular weight and sufficient ionizable radicals to render soil aggregates water-stable.

As hereinbefore stated, this invention is solely concerned with the hygroscopic solid polymeric water-soluble polyelectrolytes. However, they too possess the structural characteristics hereinbefore described.

The term "free-flowing" is employed herein to define a composition which will flow continuously and uniformly throughout actual spreading conditions. It has been found that the "free-flowing" characteristics of finely-divided pulverulent solids can be determined readily and conveniently by the use of simple equipment. This test consists in placing a measured quantity of the finely-divided, pulverulent solid in a 60° glass laboratory funnel, having a stem one inch long of nine millimeter inside diameter, while closing the discharge end of the stem with a finger. Upon removal of the finger from the discharge end of the stem, the time required for the sample of the finely-divided, pulverulent solid to flow out of the funnel is measured. A ten gram sample is a convenient quantity to use with a funnel as described above. The internal area of the stem of this funnel is of substantially the same size as the orifices in standard spreading equipment. To obtain the true flow characteristics, it is advisable to determine the flow rate of each sample for at least four passes through the funnel and take the average of these four rates.

Finely-divided, pulverulent compositions comprising a mineral acid modified sub-bentonite clay, an attapulgite clay and a hygroscopic water-soluble polyelectrolyte such as hereinbefore described which in the above-described test flow at the rate of from about 3.0 grams per second to 15 grams per second before and after being exposed to a humid atmosphere. Such compositions possess the preferred "free-flowing" characteristics according to the use of this term in this specification and its appended claims.

Also in this specification and its appended claims in defining the compositions of this invention the term "finely-divided" is employed to indicate a pulverulent solid or mixture of solids reduced to small particles of a size which will at least pass through a standard screen of 40 mesh. However, pulverulent solids which have a dry screen analysis of 95% to 100% by weight through a 325 mesh screen are not too small for the purposes of this invention. Accordingly, "finely-divided" will include pulverulent solid particles which will pass through standard screens of from about 40 mesh to about 325 mesh. Insecticidal, fungicidal, etc. dusts are, in general, within this particle size range and hence this term as used herein is understood by the art.

The examples which follow illustrate the preparation of the most preferred compositions of this invention employing typical hygroscopic synthetic polymeric water-soluble polyelectrolytes. In all of the specific examples the term "part" is employed to indicate parts by weight.

*Example I*

There is added to a blender 6000 parts of a sulfuric acid activated Mississippi bentonite clay whose total volatiles content is about 15% by weight and whose average chemical analysis is:

| | Per cent |
|---|---|
| $SiO_2$ | 71 |
| $Al_2O_3$ | 16 |
| $Fe_2O_3$ | 2 |
| $MgO$ | 4 |
| $CaO$ | 3 |
| $SO_3$ (present in $CaSO_4$ and $MgSO_4$ salts) | about 4 |
| Free $H_2SO_4$ | 0.1 to 0.4 | which had a particle size such that 90% passes through 200 mesh screen, 1500 parts of "Attaclay" (an attapulgite clay) and 2500 parts of pulverulent sodium polyacrylate, which is extremely hygroscopic, having a particle size such that 100% passed through a 40 mesh screen and a minimum of 80% passed through a 60 mesh screen. These ingredients remain in the blender for about two hours during which time a homogeneous composition is formed. The resulting mixture is then discharged through a Rotex sifter.

Samples of the resulting blend were taken at random during the sifting process. Ten gram portions of the freshly prepared blend had an average flow rate of 10 grams per second in the flow test hereinbefore described. Other portions of this blend after being stored in open containers for 14 days at about 75° F. in an atmosphere of 80% relative humidity also have an average flow rate of 10 grams per second. During this exposure to the humid atmosphere this blend absorbed 92% by weight of water based on the sodium polyacrylate.

The following compositions are prepared employing the same manipulative steps as described in Example I. Also the same ingredients are employed but the relative proportions are varied. For sake of brevity only the ingredients and the quantity of ingredients are indicated.

Example II

| | Parts |
|---|---|
| Sodium polyacrylate | 3400 |
| "Attaclay" | 3300 |
| Acid modified sub-bentonite | 3300 |

Example III

| | Parts |
|---|---|
| Sodium polyacrylate | 2500 |
| "Attaclay" | 2500 |
| Acid modified sub-bentonite | 5000 |

Example IV

| | Parts |
|---|---|
| Sodium polyacrylate | 1500 |
| "Attaclay" | 6800 |
| Acid modified sub-bentonite | 1700 |

The compositions of Examples II to IV after exposure to air at 75° F. and a relative humidity of about 80% for two weeks will be non-caking and have a flow rate of about 3 to 5 grams per second in the flow test hereinbefore described even after picking up as much as 50 to 75% by weight of water based on the sodium polyacrylate.

What is claimed is:

1. A composition comprising from about 15 to 40% by weight of a hygroscopic water-soluble polyelectrolyte having a weight-average molecular weight of at least 10,000 and containing a substantially linear continuous carbon to carbon chain derived by the polymerization of an aliphatic unsaturated group, said polymer being selected from the class consisting of salts of polymers of acrylic acid, polyacrylic acids, salts of polymers of methacrylic acid, polymethacrylic acids, salts of copolymers of unsaturated polycarboxylic acids and at least one other mono-olefinic monomer, copolymers of unsaturated polycarboxylic acids and at least one other mono-olefinic monomer, copolymers of unsaturated poly-carboxylic acid anhydrides and at least one other mono-olefinic monomer, salts of the copolymer of the partial alkyl esters of unsaturated polycarboxylic acids and at least one other mono-olefinic monomer, copolymers of the partial alkyl esters of unsaturated polycarboxylic acids and at least one other mono-olefinic monomer, salts of polymers of sulfonated hydrocarbons, polymers of unsaturated amines, and polymers of unsaturated amides; and from about 60% to about 85% by weight of a mixture comprising finely divided, pulverulent solid particles of from about 0.25 parts to about 2.0 parts by weight of an attapulgite clay for each part by weight of an acid modified sub-bentonite clay.

2. A finely-dvided, pulverulent solid composition comprising from about 15% to about 40% by weight of finely-divided, pulverulent solid particles of a hygroscopic polymeric water-soluble polyelectrolyte having a weight-average molecular weight of at least 10,000 and containing a substantially linear continuous carbon chain derived by the polymerization of an aliphatic unsaturated group, and finely-divided solid particles of an attapulgite clay and an acid modified sub-bentonite clay wherein the ratio of the attapulgite clay to acid modified clay is from about 2:1 to about 1:4.

3. The composition of claim 2 wherein the hygroscopic polyelectrolyte is sodium polyacrylate.

4. A finely-divided, pulverulent solid composition comprising about 25% by weight of finely-divided, pulverulent solid particles of sodium polyacrylate, about 10% to 20% by weight of finely-divided solid particles of an attapulgite clay and from about 55% to 65% by weight of an acid modified sub-bentonite clay.

5. A finely-divided, pulverulent composition comprising from about 15% to about 40% by weight of a finely-divided, pulverulent solid hygroscopic water-soluble polyelectrolyte containing a linear carbon chain derived by the polymerization of a compound through aliphatic carbon to carbon unsaturation and having a molecular weight such as to improve the water stability of soil aggregates, and from about 60% to about 85% by weight of a mixture comprising finely-divided, pulverulent solid particles of from about 0.25 parts to about 2.0 parts by weight of an attapulgite clay for each part by weight of an acid modified sub-bentonite clay.

6. A composition comprising from about 15% by weight to about 40% by weight of finely-divided, pulverulent solid particles of a hygroscopic high molecular weight polymer containing a substantially linear continuous carbon chain derived by the polymerization of aliphatic unsaturated groups and having a number of ionizable substituents such as to render the polymer water-soluble and improve the water stability of soil aggregates, and from about 60% to about 85% by weight of a mixture comprising finely-divided, pulverulent solid particles of from about 0.25 parts to about 2.0 parts by weight of an attapulgite clay for each part by weight of an acid modified sub-bentonite clay.

References Cited in the file of this patent

UNITED STATES PATENTS

| | | |
|---|---|---|
| 2,296,689 | Soderberg | Sept. 22, 1942 |
| 2,594,258 | Durgin | Apr. 22, 1952 |
| 2,625,529 | Hedrick et al. | Jan. 13, 1953 |